United States Patent [19]

Kobayashi et al.

[11] Patent Number: 5,258,066
[45] Date of Patent: Nov. 2, 1993

[54] INK CONTAINING HALOGENATED ALKANOL WITH 2 TO 4 CARBON ATOMS, RECORDING METHOD AND APPARATUS USING THE SAME

[75] Inventors: Masatsune Kobayashi; Shohji Koike, both of Yokohama; Shinichi Tochihara, Hadano; Kyoko Fukushima, Yokohama; Akira Nagashima, Tokyo; Koromo Shirota, Inagi; Kumiko Mafune, Kawasaki, all of Japan

[73] Assignee: Canon Kabushiki Kaisha, Tokyo, Japan

[21] Appl. No.: 789,879

[22] Filed: Nov. 12, 1991

[30] Foreign Application Priority Data

Nov. 29, 1990 [JP] Japan .................... 2-325457
Nov. 29, 1990 [JP] Japan .................... 2-325458
Nov. 29, 1990 [JP] Japan .................... 2-325459

[51] Int. Cl.$^5$ ............................ C09D 11/02
[52] U.S. Cl. .................. 106/22 R; 106/20 D
[58] Field of Search .................... 106/20-22

[56] References Cited

U.S. PATENT DOCUMENTS

| 4,385,900 | 5/1983 | Möckli ............... 8/471 |
| 4,853,036 | 8/1989 | Koike et al. ............ 106/20 |
| 4,957,553 | 9/1990 | Koike et al. ............ 106/20 |
| 5,075,699 | 12/1991 | Koike et al. ........... 346/1.1 |

FOREIGN PATENT DOCUMENTS 55-029546 3/1980 Japan .
1156932 4/1990 U.S.S.R. .

OTHER PUBLICATIONS

Derwent Abstract (WPI) No. 91-069039 with respect to Japanese Patent Document No. 3-017034 (Jan. 25, 1991).
Derwent Abstract (WPI) No. 91-069034 with respect to Japanese Patent Document No. 3-017029 (Jan. 25, 1991).
Derwent Abstract (WPI) No. 91-012473 with respect to Japanese Patent Document No. 2-286797 (Nov. 26, 1990).
Derwent Abstract (WPI) No. 85-212451 with respect to Japanese Patent Document No. 60-011564 (Jan. 21, 1985).

Primary Examiner—Mark L. Bell
Assistant Examiner—M. Einsmann
Attorney, Agent, or Firm—Fitzpatrick, Cella, Harper & Scinto

[57] ABSTRACT

An ink comprising a dye and a liquid medium for dissolving or dispersing a dye, wherein the liquid medium comprises an alkyl alcohol having 2 to 4 carbon atoms, in which at least one of the hydrogen atoms is substituted by a halogen atom.

11 Claims, 3 Drawing Sheets

FIG. IA
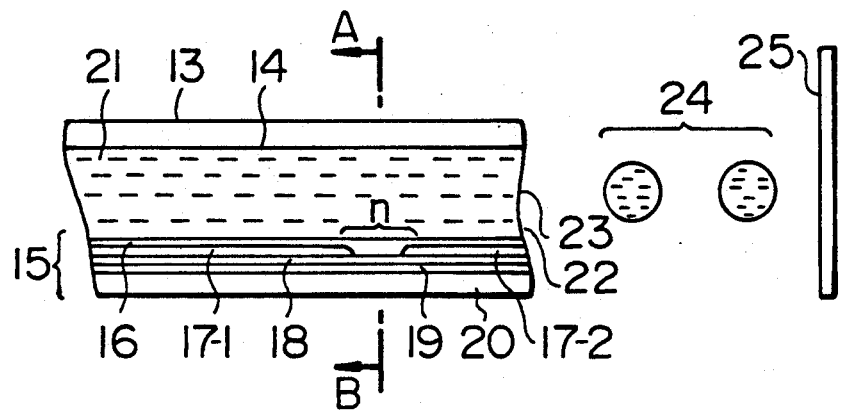
FIG. IB
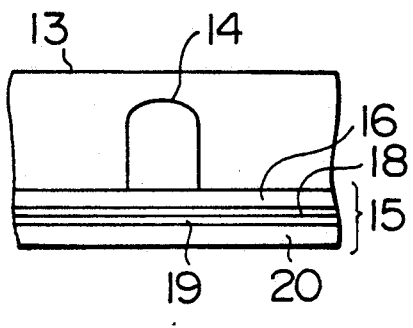
FIG. 2
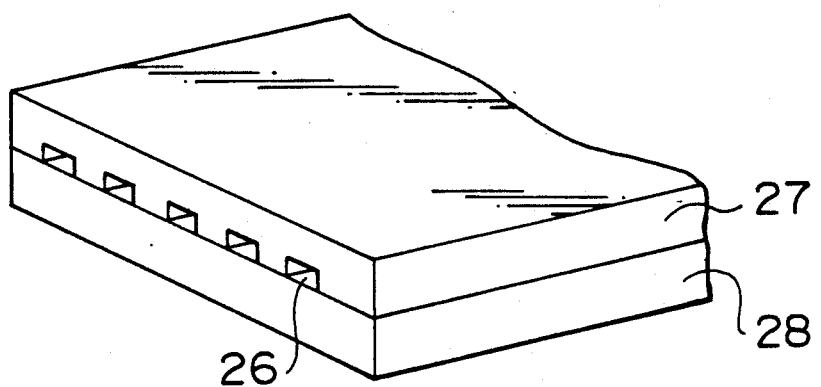

INK CONTAINING HALOGENATED ALKANOL WITH 2 TO 4 CARBON ATOMS, RECORDING METHOD AND APPARATUS USING THE SAME

BACKGROUND OF THE INVENTION

1. Field of the Invention

The present invention relates to an ink suitable for ink-jet recording and also to a recording method and apparatus using the same. In particular, the present invention relates to an ink that is capable of achieving highly detailed and high image quality recording not only on coated paper specially prepared for ink-jet recording, but also on non-coated and plain paper, such as paper for copying, paper for reporting, notepaper, letter paper, and bond paper or continuous slip paper, that is commonly used in offices and homes, and also to a recording method and apparatus using the same.

2. Related Background

Inks with greatly varying compositions have been hitherto reported with respect to inks for ink-jet recording. In particular, in recent years, detailed research and developments have been made from various approaches such as composition and physical properties so that a good record can be made even on a plain paper, such as paper for copying, paper for reporting, notepaper, letter paper, bond paper or continuous slip paper, as commonly used in offices. Such ink generally comprises an organic solvent with a high boiling point, such as glycols, for the purpose of anti-dryness and anti-clogging. However, in a case where a record can be made on a plain paper with high sizing degree using such an ink, ink cannot easily permeate into paper and the recorded portion cannot dry quickly. Therefore, there has been a problem in ink-fixing property such that hands become dirty when the recorded matter is touched, and letters are rubbed to become dirty.

Under such circumstances, in order to increase the permeation of ink into paper, Japanese Patent Application Laid-Open No. 55-29546 proposes a method in which a large amount of a surfactant is added in ink. In such an instance, the following problems have been caused: feathering occurs very frequently on some kinds of paper; when filled in an ink-jet recording head, the ink recedes from the orifice surface depending on the structural conditions of the head, resulting in no ejection of ink, or on the other hand, the whole of the orifice surface becomes wet, also resulting in no ejection of ink.

Japanese Patent Application Laid-Open No. 58-57862 proposes a method in which the pH of the ink is adjusted to the alkaline side. In this instance, however, there are disadvantages such that the ink is harmful when touched by hand or good results cannot be obtained in view of both feathering and drying performance when the ink is used on a paper that contains a certain kind of sizing agent, e.g., a neutralized paper. Besides the foregoing, various improvements have been attempted. Up to the present, however, no ink is known which can satisfactorily settle all the above problems with respect to feathering, drying performance and safety of ink, and also the problem of clogging.

SUMMARY OF INVENTION

Accordingly, an object of the present invention is to provide an ink that has resolved the problems of feathering and drying retardation of printed matter, and can achieve an excellent image quality when recording is carried out on non-coated paper such a paper for copying, paper for reporting, notepaper, letter paper, bond paper or continuous slip paper, i.e., what is called a plain paper, as commonly used in offices.

Another object of the present invention is to provide an ink that is safe even when used in offices and homes.

Still another object of the present invention is to provide an ink that is not liable to cause clogging at the orifice and also has a good reliability, and to provide an ink-jet recording method, a recording unit, an ink-jet recording apparatus and an ink cartridge using the same.

The above objects of the present invention can be achieved by the present invention described below.

The present invention provides an ink comprising a dye and a liquid medium for dissolving or dispersing a dye, wherein the liquid medium comprises an alkyl alcohol having 2 to 4 carbon atoms, in which at least one of the hydrogen atoms is substituted by a halogen atom.

The present invention also provides an ink-jet recording method comprising ejecting ink described above from an orifice of a recording head in accordance with a recording signal to make a record on a recording medium.

The present invention also provides a recording unit comprising an ink container that holds an ink described above and a head from which the ink is ejected in the form of droplets.

The present invention also provides an ink-jet recording apparatus comprising a recording unit described above.

The present invention also provides an ink cartridge comprising an ink container that holds the ink described above.

The present invention also provides an ink-jet recording apparatus comprising an ink cartridge described above, a recording head for ejecting ink droplets, an ink supplying portion for supplying ink to a recording head from the ink cartridge.

BRIEF DESCRIPTION OF THE DRAWINGS

FIGS. 1A and 1B illustrate a longitudinal vertical cross-section and a traverse cross-section, respectively, of a head of an ink-jet recording apparatus.

FIG. 2 is a perspective illustration of a head comprised of a multiple set of the heads as shown in FIGS. 1A and 1B.

DETAILED DESCRIPTION OF THE PREFERRED EMBODIMENTS

Figure 3:
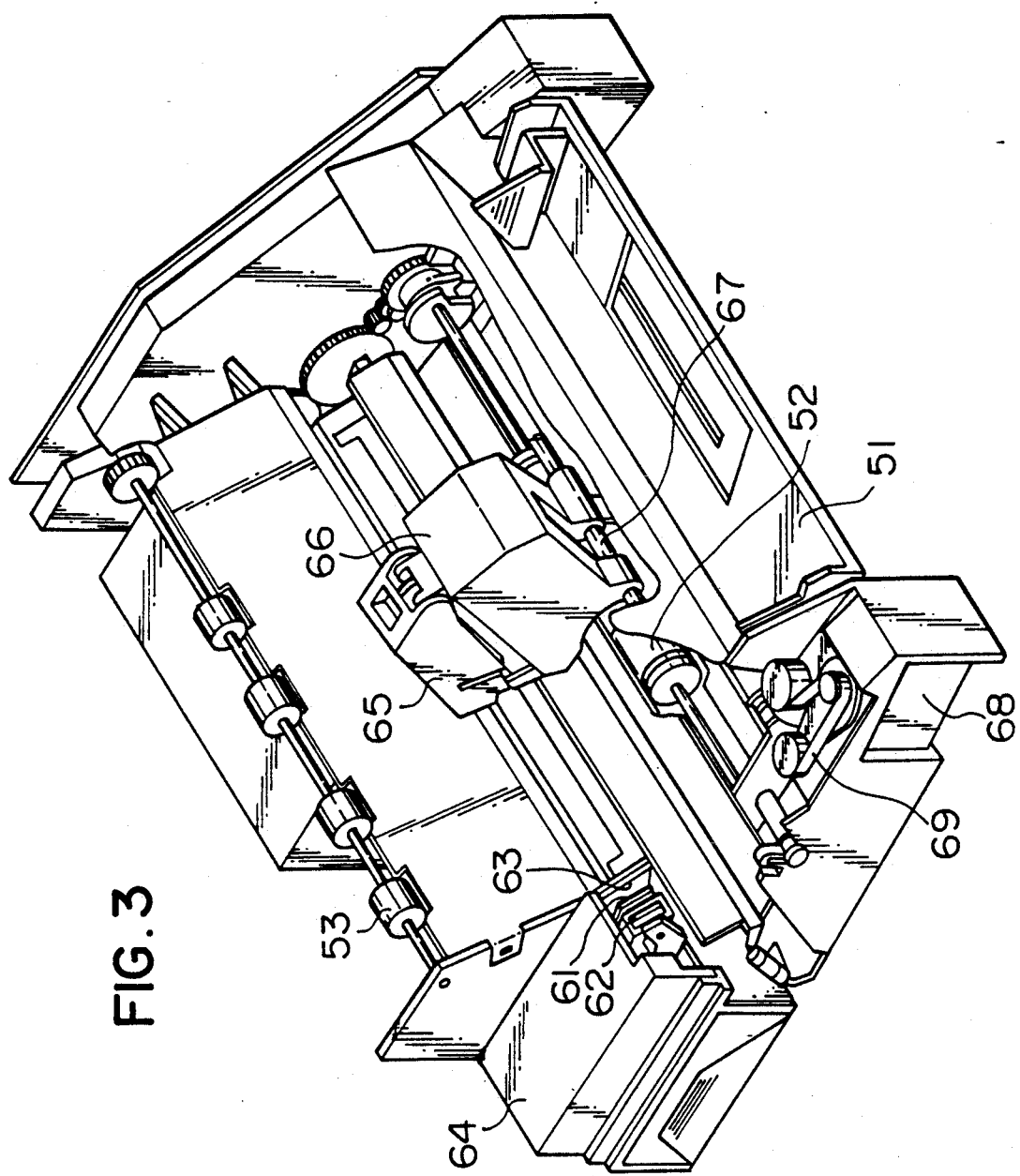
FIG. 3 is a perspective illustration of an ink-jet recording apparatus.

The present inventors have made intensive studies with respect to various manners of ink composition with good reliability that can improve anti-feathering, drying performance, and permeation of ink on plain paper. As a result, they have found that ink comprising the above-mentioned alkyl alcohol (or alkanol) can be well balanced in anti-feathering and permeation of ink characteristics, and also can achieve good reliability with anti-clogging and safety. According to what is known by the inventors as to the feathering and the permeation of ink on a plain paper, good results cannot be necessarily obtained if ink containing surfactant is used. This is because, in a case where such an ink is used, the results are influenced by the kind of paper used.

On the other hand, in the case where the ink of the present invention is used, it is possible to carry out a stable recording without being influenced by the kind of paper. The reason is as follows.

Feathering and permeation of ink are largely influenced by a phenomenon of the wettability at the interface between the ink droplet and paper. In the case where a surfactant-containing ink is used, the wettability of ink to paper is different at the surface and the interior of the ink droplet attached to paper. Therefore, good results cannot be obtained.

On the other hand, in the case where the ink of the present invention is used, it can be presumed that the difference of the wettability is not caused and affinity for a sizing agent added to paper, present on the surface and interior thereof, can be given in a miraculous balance for a plain-paper-adapted ink-jet ink.

Alkyl alcohols, which are used and characterized in the present invention are as follows:

a) Halogenized derivatives of ethyl alcohol represented by the following Formula (I):

wherein X denotes a hydrogen atom or halogen atom and at least one of X denotes a halogen atom.

b) Halogenized derivatives of propane having one hydroxyl group;

c) Halogenized derivatives of butane having one hydroxyl group.

These compounds are obtained by using conventionally known production methods.

Halogenized derivatives of ethyl alcohol preferably include 2,2,2-trifluoroethanol, 2,2,2,-trichloroethanol, 2,2,2-tribromoethanol, 2,2-difluoroethanol, 2,2-dichloroethanol and 2-bromoethanol.

Compounds which are used in the present invention are not limited to the compounds described above.

The amount of these compounds added to the ink depends on the type of dyes used and the type of liquid medium components. In general, these compounds may be contained in an amount of approximately from 0.01 to 30% by weight, preferably from 0.1 to 20% by weight, more preferably from 0.5 to 10% by weight, based on the total weight of the ink.

Halogenized derivatives of propane having one hydroxyl group preferably include 2,2,3,3,3-pentafluoro-1-propanol, 1,1,1,3,3,3-hexafluoro-2-propanol, 1H,1H-pentafluoro-1-propanol, 2,2,3,3-tetrafluoro-1-propanol, 2,3-dibromo-1-propanol, 1,1,1-trifluoro-2-propanol, 3-bromo-1-propanol, 3-chloro-1-propanol, 1-bromo-3-chloro-2-propanol and 1,1,3-trihydroperfluoro-1-propanol.

Compounds which are used in the present invention are not limited to the compounds described above.

The amount of these compounds added to the ink depends on the type of dyes used and the type of liquid medium components. In general, these compounds may be contained in an amount of approximately from 0.01 to 15% by weight, preferably from 0.1 to 10% by weight, more preferably 0.1 to 5% by weight, based on the total weight of the ink.

Halogenized derivatives of butane having one hydroxyl group preferably include 1,4-dibromo-2-butanol, 4-chloro-1-butanol, 1H,1H-pentafluoro-1-butanol, hexafluoro-2-methyl-isopropanol, 3,3,4,4,4-pentafluoro-1-butanol and 2-(trifluoromethyl)-1-propanol.

Compounds which are used in the present invention are not limited to the compounds described above.

The amount of these compounds added to the ink depends on the type of dyes used and the type of liquid medium components. In general, these compounds may be contained in an amount of approximately from 0.01 to 15% by weight, preferably from 0.1 to 5% by weight, more preferably from 0.1 to 3% by weight, based on the total weight of the ink.

The ink of the present invention is characterized in containing a particular alkyl alcohol described above. However, water and other organic solvents in conventionally known inks can also be used so long as they can be used without hindrance.

Such organic solvents include, for example, alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketoalcohols such as acetone and diacetone alcohol; ethers such as tetrahydrofuran and dioxane; oxyethylene or oxypropylene addition polymers such as diethylene glycol, triethylene glycol, tetraethylene glycol, dipropylene glycol, tripropylene glycol, polyethylene glycol and polypropylene glycol; alkylene glycols whose alkylene group has 2 to 6 carbon atoms, such as ethylene glycol, propylene glycol, trimethylene glycol, butylene glycol, 1,2,6-hexanetriol and hexylene glycol; thiodiglycol; glycerol; lower alkyl ethers of polyhydric alcohols, such as ethylene glycol monomethyl or -ethyl ether, diethylene glycol monomethyl or -ethyl ether and triethylene glycol monomethyl or -ethyl ether and tetraethylene glycol dimethyl or -ethyl ether; sulfolane, N-methyl-2-pyrrolidone, 2-pyrrolidone and 1,3-dimethyl-2-imidazolidinone.

The above described water-soluble organic solvent may be contained in an amount ranging from 0.5% to 50% by weight, and preferably from 1% to 30% by weight, based on the total weight of the ink.

It is possible to use such an organic solvent alone or in combination as a liquid medium. Preferably, the liquid medium component contains water and at least one of the organic solvents including water-soluble organic solvent with a high boiling point, as for example, polyhydric alcohols such as diethylene glycol, triethylene glycol, glycerol, 1,2,6-hexanetriol and thiodiglycol; and 2-pyrrolidone.

The dye which is contained in the ink of the present invention may include direct dyes, acid dyes, food dyes, basic dyes, reactive dyes, disperse dyes, vat dyes, water-soluble vat dye, reactive disperse dyes, oil dyes and pigments. In particular, a water-soluble dye is preferred on properties of ink.

The amount of these dyes depends on the kind of liquid medium components and the properties required in ink, etc. In general, the dye may be contained in an amount of approximately from 0.2 to 20% by weight, preferably from 0.5 to 10% by weight, more preferably from 1 to 5% by weight, based on the total weight of the ink.

The essential components of the ink of the present invention are as described above. It is possible to add other various kinds of dispersants, surfactants, viscosity modifiers, surface tension modifiers, and fluorescent brightening agents.

For example, these added components include viscosity modifiers such as polyvinyl alcohol, cellulose and water-soluble resins; all sorts of surfactants of cationic, anionic or nonionic nature; surface tension modifiers such as diethanolamine and triethanolamine; pH adjusters comprising a buffer; and mildewproofing agents.

For the purpose of preparing the ink used in an ink-jet recording method in which recording is carried out by electrifying ink, a resistivity modifier may be added. Such a resistivity modifier includes inorganic salts such as lithium chloride, ammonium chloride and sodium chloride.

The ink of the present invention can be particularly preferably used in the ink-jet recording in which recording is carried out by ejecting ink droplets using a phenomenon of ink bubbling caused by heat energy. When the ink is used in such ink-jet recording, ejection of the ink becomes particularly stable and satellite dots do not occur. In this instance, thermal physical properties such as specific heat, thermal expansion coefficient, and thermal conductivity may be adjusted.

The ink of the present invention can resolve the problems concerning the feathering of ink, the drying performance of recorded matter and the permeation of ink, which arise when recording is carried out on plain paper or the like. At the same time, it can match the recording head in an improved state. From these viewpoints, the physical properties of the ink should be adjusted to give a surface tension of from 30 to 68 dyne/cm at 25° C. and a viscosity of not more than 15 cP, preferably not more than 10 cP, and more preferably not more that 5 cP.

Accordingly, in order to adjust the ink so as to have the properties described above and to resolve the problems on plain paper, water may be contained in the ink in an amount of not less than 50% by weight, preferably not less than 60% by weight, more preferably not less than 75% by weight, based on the total weight of the ink.

The ink of the present invention can be particularly preferably used in ink-jet recording in which recording is carried out by ejecting ink droplets by an action of heat energy. Needless to say, it can also be used for usual writing implements.

The method and apparatus suited to carry out recording by the use of the ink of the present invention may include a method and apparatus in which a heat energy corresponding with a recording signal is imparted to the ink held in the interior of a recording head so that ink droplets are generated by an action of the heat energy.

FIGS. 1A and 1B show an example of the construction of the head, which is a main component of the apparatus.

A head 13 is formed by bonding a glass, ceramic or plastic plate or the like having a groove 14 through which ink is passed, to a heating head 15 used in thermal recording (the drawing shows a head, to which, however, the present invention is not limited). The heating head 15 is constituted of a protection layer 16 formed of silicon oxide or the like, aluminum electrodes 17-1 and 17-2, a heating resistor layer 18 formed of nichrome and so forth, a heating accumulating layer 19, and a substrate plate 20 with a good heat dissipation property.

The ink 21 reaches an ejection orifice 22 (a minute opening) and a meniscus 23 is formed there by a pressure P.

Now, upon application of electric signals to the electrodes 17-1 and 17-2, heat is abruptly generated at the region denoted by n in the heating head 15, so that bubbles are generated in the ink 21 coming into contact with this region. The pressure thus produced thrusts out the meniscus 23 and the ink 21 is ejected from the orifice 22 in the form of recording droplets 24 to fly against a recording medium 25. FIG. 2 illustrates a multi-head comprising the head as shown in FIG. 1A, arranged in a large number. The multi-head is prepared by closely adhering a glass plate 27 having a multi-grooves 26, to a heating head 28 similar to the head as illustrated in FIG. 1A.

FIG. 1A is a cross-sectional view of the head 13 along its ink flow path, and FIG. 1B is a cross-sectional view along the line 1B—1B in FIG. 1A.

FIG. 3 shows an example of an ink-jet recording apparatus in which such a head has been incorporated.

In FIG. 3, reference numeral 61 denotes a blade serving as a wiping member, one end of which is a stationary end retained by a blade-retaining member. The blade 61 is provided at the position adjacent to the region in which a recording head makes a record. In the present example, the blade is retained in such a form that it protrudes into the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorption member provided adjoiningly to the blade 61, and, similar to the blade 61, is retained in such a form that it protrudes into the course through which the recording head is moved. The above blade 61, cap 62 and ink absorption member 63 constitute an ejection-recovery portion 64, where the blade 61 and the ink absorption member 63 remove water, dust or the like from the ink ejection opening face.

Reference numeral 65 denotes the recording head having an ejection energy generating means and ejects ink to the recording medium set opposingly to the ejection opening face provided with ejection openings, to carry out recording. Reference numeral 66 denotes a carriage on which the recording head 65 is mounted so that the recording head 65 can be moved. The carriage 66 is slideably associated with a guide rod 67. A part of the carriage 66 is connected (not shown) with a belt 69 driven by a motor 68. Thus, the carriage 66 can be moved along the guide rod 67 and hence the recording head 65 can be moved from a recording region to a region adjacent thereto.

Reference number 51 denotes a paper feeding part from which recording mediums are inserted, and number 52 denotes a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the ejection-recovery portion 64 is receded from the moving course of the recording head 65 when the recording head 65 is returned to its home position, e.g., after completion of recording, and the blade 61 stands protruded into the moving course. As a result, the ejection opening face of the recording head 65 is wiped. When the cap 62 comes into contact with the ejection opening face of the recording head 65 to carry out capping, the cap 62 is moved in such a way that it protrudes to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
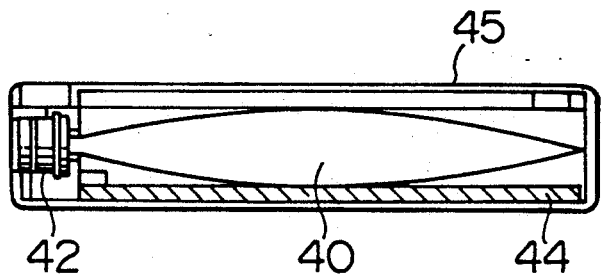
FIG. 4 is a longitudinal cross-sectional illustration of an ink cartridge.

FIG. 4 shows an example of an ink cartridge, denoted as 45, that holds the ink being fed to the head through an ink-feeding member as exemplified by a tube (not shown). Herein reference numeral 40 denotes an ink container portion that holds the feeding ink, as exemplified by an ink bag. The top thereof is provided with a stopper 42 made of rubber. A needle (not shown) may be inserted to this stopper 42 so that the ink in the ink container portion 40 can be fed to the head. Reference numeral 44 denotes an absorption member that receives a waste ink.

It is preferred in the present invention that the ink holder is formed of a polyolefin, in particular, polyethylene, at its surface with which the ink comes into contact.

Figure 5:
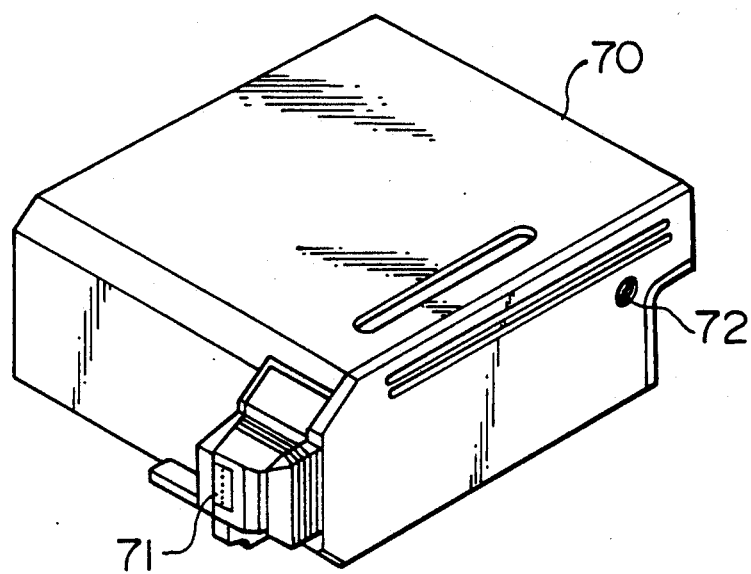
FIG. 5 is a perspective illustration of a recording unit.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, reference numeral 70 denotes a recording unit, in the interior of which an ink container portion that holds an ink, a exemplified by an ink absorption member, is contained. The recording unit is so constructed that the ink in such an ink absorption member is ejected in the form of ink droplets from a head 71 having a plurality of orifices. As a material for the ink absorption member, it is preferred in the present invention to use polyurethane.

Reference numeral 72 denotes an air path opening through which the interior of the recording unit is made to communicate with the atmosphere.

This recording unit 70 can be used in place of the recording head shown in FIG. 3, and is detachably mounted to the carriage 66.

The present invention will be described below in a more specific manner by giving examples and comparative examples. In the following, "part(s)" and "%" are by weight unless particularly noted.

EXAMPLES 1 TO 5

The respective components as shown below were mixed and stirred for 5 hours. Thereafter, the resulting solution was adjusted to have a pH value of 7.5 with an aqueous 0.1% sodium hydroxide solution and then subjected to pressure filtration using a membrane filter of 0.22 μm in pore size. Inks A to E of the present invention were thus obtained.

Next, recording was carried out using the resulting inks A to E and also using an ink-jet recording apparatus the ink-jet printer BJ-10 (trade name; manufactured by Canon Inc.) with a heater element as an energy source for the ejection of ink. The recording was carried out on commercially available paper for copying and bond paper to evaluate the fixing performance of recorded characters, the feathering occurrence, the anti-clogging when printing is re-started after a pause of printing, and the frequency response. Results obtained are shown in Table 1.

| Ink A: | |
|---|---|
| C.I. Direct Yellow 86 | 2 parts |
| Diethylene glycol | 15 parts |
| 2,2,2-trifluoroethanol | 3 parts |
| Water | 80 parts |
| Ink B: | |
| C.I. Acid Red 35 | 2 parts |
| Glycerol | 10 parts |
| 2,2,2-trichlorethanol | 1.8 parts |
| Ethylene glycol | 5.5 parts |
| Water | 80.7 parts |
| Ink C: | |
| C.I. Food Black 2 | 3 parts |
| Triethylene glycol | 10 parts |
| N-methyl-2-pyrrolidone | 2 parts |
| 2,2,2-tribromoethanol | 3.2 parts |
| Water | 81.8 parts |
| Ink D: | |
| C.I. Direct Blue 199 | 2.5 parts |
| 1,2,6-hexanetriol | 5 parts |
| Diethylene glycol | 10 parts |
| Triethylene glycol monomethyl ether | 2 parts |
| Triethanol amine | 0.5 parts |
| 2,2-dichloroethanol | 3.5 parts |
| Water | 76.5 parts |
| Ink E: | |
| C.I. Direct Black 154 | 2 parts |
| Thiodiglycol | 6 parts |
| Diethylene glycol | 9 parts |
| 2-Bromoethanol | 2.2 parts |
| Water | 80.8 parts |

COMPARATIVE EXAMPLES 1 TO 3

Using the components as shown below, inks F to H of Comparative Examples 1 to 3 were obtained in the same manner as in Examples 1 to 5, and the evaluation on every item was made in the same manner as in the Examples. The results obtained are shown in Table 1.

| Ink F: | |
|---|---|
| C.I. Direct Yellow 86 | 2 parts |
| Diethylene glycol | 15 parts |
| Water | 83 parts |
| Ink G: | |
| C.I. Food Black 2 | 3 parts |
| Diethylene glycol | 10 parts |
| Triethylene glycol | 10 parts |
| Nonionic surfactant* | 0.5 parts |
| Water | 76.5 parts |
| Ink H: | |
| C.I. Acid Red 35 | 2 parts |
| Glycerol | 10 parts |
| Ethanol | 1.8 parts |
| Ethylene glycol | 5.5 parts |
| Water | 80.7 parts |

*Nonionic surfactant (trade name: Nissan Nonion P-223; available from Nippon Oil & Fats Co., Ltd.)

TABLE 1

| Ink: | Example 1 A | Example 2 B | Example 3 C | Example 4 D | Example 5 E | Comparative Example 1 F | Comparative Example 2 G | Comparative Example 3 H |
|---|---|---|---|---|---|---|---|---|
| **Fixing performance:*1)** | | | | | | | | |
| Paper for copying | AA | A | AA | A | A | C | AA | A |
| Bond Paper | AA | AA | AA | AA | AA | B | AA | AA |
| **Feathering occurrence:*2)** | | | | | | | | |
| Paper for copying | A | A | A | A | A | A | C | A |
| Bond Paper | A | A | A | A | A | A | B | A |
| Anti-clogging at the time of re-printing after pause:*3) | A | A | A | A | A | B | B | C |
| Frequency response:*4) | AA | AA | AA | AA | AA | C | B | C |

*1) Evaluation on fixing performance:

Characters were printed on commercially available paper for copying and bond paper, and then the printed characters were rubbed with a filter paper (trade name: No. 5C, available from Toyo Roshi K.K.) after a lapse of 10 seconds and 30 seconds.

Evaluation was carried out under conditions of 25° C. and 60% RH.

AA: Not blurred when rubbed after a lapse of 10 seconds.

A: Slightly blurred when rubbed after a lapse of 10 seconds.

B: Slightly blurred when rubbed after a lapse of 30 seconds.

C: Greatly blurred when rubbed after a lapse of 30 seconds.

*2) Feathering occurrence:

To examine the occurrence of feathering, 300 dots were printed with a printer on commercially available paper for copying and bond paper, in a discontinuous fashion. Thereafter, the printed dots were left to stand for 1 hour or more and then the number of dots on which the feathering occurred was counted through observation with a microscope. The proportion of the count to the total number of the dots was indicated by %.

Printing was carried out under conditions of 25° C. and 60% RH.

A: 10% or less

B: 11% to 30%

C: 31% or more

*3) Anti-clogging at the time of re-printing after pause:

To evaluate the anti-clogging observed when printing is re-started after a temporary stop of printing, a given ink was charged in the printer, and English characters were continuously printed for 10 minutes and then the printing was stopped. After the printer was left to stand for 10 minutes in an uncapped state, English characters were again printed. The evaluation was made on whether or not there was defective print such as blurred characters or characters with unsharp edges.

The evaluation was carried out under conditions of 25° C. and 60% RH.

A: No defective print is seen on the first and subsequent characters

B: A part of the first character is blurred or has unsharp edges.

C: The first character can not be printed at all.

*4) Evaluation on frequency response:

The state of print obtained by the printing, i.e., defectiveness such as blurred characters or blank areas and defective ink-droplet impact such as splash or slippage were observed with the naked eye to make an evaluation.

AA: The ink can be shot under good follow-up to the frequency, so that none of blurred characters, blank areas and defective ink-droplet impact are seen in both solid print and character print.

A: The ink can be shot under substantially good follow-up to the frequency, so that none of the blurred characters, blank areas and defective ink-droplet impact are seen in character print, but with slightly blurred in solid print.

B: None of blurred characters and blank areas are seen in character print, but defective ink-droplet impact is partly seen. In solid print, blurred and blank areas are seen in about one-third of the whole of the solid print.

C: A large number of blurred and blank areas are seen in solid print, and a large number of blurred characters and defective ink-droplet impact are also seen in character print.

EXAMPLES 6 TO 15

Using the components as shown below, inks I to R of Examples 6 to 15 were obtained in the same manner as in Examples 1 to 5, and the evaluation on every item was made in the same manner as in the Examples. The results obtained are shown in Table 2.

Ink I

The same ink as Ink A except that 1 part of 3,3,4,4,4-pentafluoro-2-butanol was used in place of 3 parts of 2,2,2-trifluoroethanol, and 82 parts of water was used in place of 80 parts of water.

Ink J

The same ink as Ink B except that 0.8 parts of 1H,1H-pentafluoro-1-butanol was used in place of 1.8 parts of 2,2,2-trichloroethanol, and 81.7 parts of water was used in place of 80.7 parts of water.

Ink K

The same ink as Ink C except that 1 part of 1,4-dibromo-2-butanol and 0.5 parts of 4-chloro-1-butanol were used in place of 3.2 parts of 2,2,2-tribromoethanol and 83.5 parts of water was used in place of 81.8 parts of water.

Ink L

The same ink as Ink D except that 1 part of 1,4-dibromo-2-butanol was used in place of 3.5 parts of 2,2-dichloroethanol and 79 parts of water was used in place of 76.5 parts of water.

Ink M

The same ink as Ink E except that 1.5 parts of hexafluoro-2-methylisopropanol was used in place of 2.2 parts of 2-bromoethanol and 81.5 parts of water was used in place of 80.8 parts of water.

Ink N

The same ink as Ink A except that 1.2 parts of 2,2,3,3,3-pentafluoro-1-propanol was used in place of 3 parts of 2,2,2-trifluoroethanol and 81.8 parts of water was used in place of 80 parts of water.

Ink O

The same ink as Ink B except that 1.5 parts of 2,2,3,3-tetrafluoro-1-propanol was used in place in 2,2,2-trichloroethanol and 81 parts of water was used in place of 80.7 parts of water.

Ink P

The same ink as Ink C except that 1.5 parts of 3-chloro-1-propanol was used in place of 3.2 parts of 2,2,2-tribromoethanol and 83.5 parts of water was used in place of 81.8 parts of water.

Ink Q

The same ink as Ink D except that 2 parts of 1,1,1,3,3,3-hexafluoro-2-propanol was used in place of 3.5 parts of 2,2-dichloroethanol and 78 parts of water was used in place of 76.5 parts of water.

Ink R

The same ink as Ink E except that 2 parts of 1,1,3-trihydroperfluoro-1-propanol was used in place of 2.2 parts of 2-bromoethanol and 81 parts of water was used in place of 80.8 parts of water.

achieve a superior frequency response in printing where ink is ejected utilizing a phenomenon of ink bubbling caused by thermal energy.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink solution comprising a water soluble dye and a liquid medium for dissolving or dispersing a dye, wherein the liquid medium comprises water and an alkyl alcohol having 2 to 4 carbon atoms, in which at least one of the hydrogen atoms is substituted by a halogen atom.

2. An ink solution according to claim 1, wherein the alkyl alcohol includes one represented by the following Formula (I):

wherein X denotes a hydrogen atom or a halogen atom and at least one of X denotes a halogen atom.

3. An ink solution according to claim 2, wherein the alkyl alcohol includes 2,2,2-trifluoroethanol, 2,2,2-trichloroethanol, 2,2,2-tribromoethanol, 2,2-difluoroethanol, 2,2-dichloroethanol and 2-bromoethanol.

4. An ink solution according to claim 1, wherein the alkyl alcohol has 3 carbon atoms.

5. An ink solution according to claim 4, wherein the alkyl alcohol includes 2,2,3,3,3-pentafluoro-1-propanol, 1,1,1,3,3,3-hexafluoro-2-propanol, 1H, 1H-pentafluoro-1-propanol, 2,2,3,3-tetrafluoro-1-propanol, 2,3-dibromo-1-propanol, 1,1,1-trifluoro-2-propanol, 3-bromo-1-propanol, 3-chloro-1-propanol, 1-bromo-3-chloro-2-propanol and 1,1,3-trihydroperfluoro-1-propanol.

6. An ink solution according to claim 1, wherein the alkyl alcohol has 4 carbon atoms.

7. An ink solution according to claim 6, wherein the alkyl alcohol includes 1,4-dibromo-2-butanol, 4-chloro-1-butanol, 1H, 1H-pentafluoro-1-butanol, hexafluoro-2-methylisopropanol, 3,3,4,4,4-pentafluoro-3-butanol and 2-(trifluoromethyl)-2-propanol.

TABLE 2

| | Example | | | | | | | | | |
|---|---|---|---|---|---|---|---|---|---|---|
| | 6 | 7 | 8 | 9 | 10 | 11 | 12 | 13 | 14 | 15 |
| Ink: | I | J | K | L | M | N | O | P | Q | R |
| Fixing performance:*1) | | | | | | | | | | |
| Paper for copying | AA | AA | AA | A | AA | AA | A | AA | AA | AA |
| Bond Paper | AA | AA | AA | AA | AA | AA | AA | AA | AA | AA |
| Feathering occurrence:*2) | | | | | | | | | | |
| Paper for copying | A | A | A | A | A | A | A | A | A | A |
| Bond Paper | A | A | A | A | A | A | A | A | A | A |
| Anti-clogging at the time of re-printing after pause:*3) | A | A | A | A | A | A | A | A | A | A |
| Frequency response:*4) | AA | AA | AA | AA | AA | AA | AA | AA | AA | AA |

As explained above, according to the present invention, it is possible to carry out recording with a superior quality level and a good fixing performance, causing no feathering even on a plain paper such as paper for copying, paper for reprint, notepaper, letter paper, bond paper or continuous slip paper, as commonly used in offices.

It is also possible to obtain an ink having a high safety even when used in offices and homes.

It is still also possible to carry out recording that may not cause clogging at the nozzles of a head for ink-jet recording and has a good reliability, and especially to 8. An ink solution according to claim 1, wherein the alkyl alcohol having two carbon atoms is provided in an amount ranging from 0.01 to 30% by weight, based on the total weight of the ink.

9. An ink solution according to claim 1, wherein the alkyl alcohol having 3 to 4 carbon atoms is provided in an amount ranging from 0.01 to 15% by weight, based on the total weight of the ink.

10. An ink solution according to claim 1, wherein the liquid medium comprises an organic solvent, wherein the organic solvent is provided in an amount ranging from 0.5 to 50% by weight, based on the total weight of the ink.

11. An ink solution according to claim 1, wherein the dye is provided in an amount ranging from 0.2 to 20% by weight, based on the total weight of the ink.

* * * * *

UNITED STATES PATENT AND TRADEMARK OFFICE
CERTIFICATE OF CORRECTION

PATENT NO. : 5,258,066
DATED : November 2, 1993
INVENTOR(S) : Masatsune KOBAYASHI, ET AL.

It is certified that error appears in the above-identified patent and that said Letters Patent is hereby corrected as shown below:

Title Page:

AT [56] REFERENCES CITED - FOREIGN PATENT DOCUMENTS:

"1156932 4/1990 U.S.S.R." should read --1556932 4/1990 U.S.S.R.--.

SHEET 1: (In the Drawings)

Figure 1A, "A" should read --1B-- and "B" should read --1B--.

COLUMN 2:

Line 1, "a" should read --as--.

COLUMN 6:

Line 14, "a" (second occurrence) should be deleted.

COLUMN 7:

Line 45, "a" should read --as--.

COLUMN 10:

Line 33, "with" should read --are--.

Signed and Sealed this

Twenty-eighth Day of June, 1994

Attest:

BRUCE LEHMAN

*Attesting Officer*     Commissioner of Patents and Trademarks